United States Patent [19]

Jachimowicz

[11] 4,297,481

[45] Oct. 27, 1981

[54] PROCESS OF FORMING POLYMERIC POLYAMINE/AMIDE

[75] Inventor: Felek Jachimowicz, Columbia, Md.

[73] Assignee: W. R. Grace & Co., New York, N.Y.

[21] Appl. No.: 123,739

[22] Filed: Feb. 22, 1980

[51] Int. Cl.$^3$ ............................................. C08G 67/02
[52] U.S. Cl. ................................... 528/392; 528/396; 528/422; 528/425
[58] Field of Search ............... 528/392, 396, 422, 425

[56] References Cited

U.S. PATENT DOCUMENTS

| | | | |
|---|---|---|---|
| 2,422,631 | 6/1947 | Olin et al. | 260/563 R |
| 3,513,200 | 5/1970 | Biale | 260/583 R |
| 3,898,188 | 8/1975 | Rembaum et al. | 525/185 |
| 3,899,534 | 8/1975 | Rembaum et al. | 424/329 |
| 4,096,150 | 6/1978 | Berthoux et al. | 260/576 |

FOREIGN PATENT DOCUMENTS 1072796  6/1967  United Kingdom .
1178308  1/1970  United Kingdom .
1378185  12/1974  United Kingdom .

*Primary Examiner*—Harold D. Anderson
*Attorney, Agent, or Firm*—Philip M. Pippenger; Howard J. Troffkin

[57] ABSTRACT

A process for forming polymeric polyamine/amide wherein said amino/amido nitrogens are positioned in the polymer backbone by contacting a monomeric nitrogen compound which has at least two labile hydrogens bonded to the nitrogen atoms therein; a monomeric hydrocarbon compound containing at least two olefinic groups therein; carbon monoxide; and water in the presence of a catalytic amount of a rhodium atom containing compound selected from metallic rhodium, rhodium salts, rhodium oxides, rhodium carbonyls and ligands thereof at a temperature of from about 50° C. to 250° C. and at a pressure of from about 30 to about 300 atmospheres.

8 Claims, No Drawings

PROCESS OF FORMING POLYMERIC POLYAMINE/AMIDE

BACKGROUND OF THE INVENTION

The present invention relates to a catalytic, one step process for readily forming polymeric material containing a multiplicity of amino nitrogen atoms therein. The subject polymeric polyamines are presently formed by complex synthetic methods as described in Offenlegungschrift No. 2,703,313 and 2,755,687 as well as U.S. Pat. Nos. 3,898,188 and 3,899,534 or by the free radical polymerization of cyclic imines such as ethyleneimine, to form the lower hydrocarbyl polyamines. The single step, catalytic process of the present invention permits the formation of a wide variety of polymeric amine/amide containing compounds in a simple, economic manner.

Catalytic alkylation of monoamines by monoolefins, carbon monoxide and hydrogen, generally referred to as catalytic aminomethylation, has been disclosed in *Experiention*, Vol. 5, p. 93 (1949) and *Liebigs Ann. Chem.*, Vol. 582, p. 148 (1953). The value of the process was, however, limited by the required use of large quantities of toxic iron or nickel carbonyls as catalyst, the rapid rate of consumption of the catalyst, the slow rate of reaction, the poor yields obtained and, moreover, the reaction was found to be restricted to ethylene or propylene as the olefinic constituent.

Higher monoolefins have been reacted in the presence of other metal carbonyls to cause aminomethylation, but the reactions have been found to be non-selective and produced, at best, only moderate yields of amines. For example, U.S. Pat. Nos. 2,422,631 and 3,234,283 disclose that lower monolefins, carbon monoxide, hydrogen, and a secondary amine will form tertiary amines in low yields in the presence of cobalt hydrocarbonyl or dicobalt octocarbonyl as well as certain other cobalt compounds.

More recently, U.S. Pat. Nos. 3,513,200 and 4,096,150 have disclosed the utilization of various Group VIII metal compounds as suitable compounds to catalyze the reaction between monoamines and monomeric olefins to form low molecular weight tertiary amines.

Each of the above teachings was directed to the formation of monomeric tertiary amines. The present process is directed to the formation of highly desired polymeric polyamine/amide in a simple and economical manner.

SUMMARY OF THE INVENTION

Polymeric compounds formed in accordance with the present invention are useful as surfactants, wet strength agents for paper products, lubricating oil additives and the like.

The present invention is directed to a one-step, catalytic method of forming polymeric compounds having a high degree of amino/amide groups in the polymer chain. The term "polymeric polyamine/amide" is used herein to define such polymeric materials having a multiplicity of amino and/or amido groups contained in the polymer chain structure.

The subject polymeric polyamine/amide can be formed by contacting a monomeric amino compound having at least two labile hydrogens; a monomeric hydrocarbon having a multiplicity of olefinic groups therein; carbon monoxide; and water in the presence of a catalytic amount of a rhodium compound selected from metallic rhodium, rhodium salts, oxides, carbonyls, phosphines or ligands. The reaction is carried out in an inert solvent at temperatures of from 50° to 250° C. and at a pressure of from about 30 to about 300 atmospheres.

DETAILED DESCRIPTION

The subject invention is directed to a new and novel one-step, catalytic method of forming polymeric polyamine/amide by contacting, in an inert solvent, a monomeric amino compound having at least two labile hydrogens therein; a hydrocarbon having a multiplicity of olefinic groups therein; carbon monoxide; and water in the presence of certain rhodium compounds as the catalyst, as more completely described herein below.

The subject process requires the use of a monomeric amino nitrogen containing compound which contains at least two labile hydrogens. Each of the labile hydrogen can be attached to the same or different nitrogen atom. Examples of amino compounds suitable for use in the subject invention are ammonia, 1,2 dimethyl hydrazine, ethylenediamine, diethylene triamine, triethylene tetraamine, propylene diamine, hexamethylene diamine, trimethylene triamine, triaminotriazine, diaminotriazine, N,N'-dimethyl ethylenediamine, N,N'-dibutyl ethylenediamine, N-methyl, N-ethyl ethylenediamine, N,N'-diphenyl ethylenediamine, phenylenediamine, piperazine and polyethyleneamine of low molecular weight such as from about 500 to 5,000 average molecular weight.

The subject process requires the use of a monomeric hydrocarbyl compound which contains at least 2 olefinic groups therein. The olefinic bond containing compound can have alicyclic, aromatic or acyclic groups attached to the olefinic moiety of the compound. The olefinic groups may be contained in a common ring of the compound but should not form an aromatic component. It is preferred that the subject monomer is a $C_4$ to $C_{20}$ monomeric compound having a multiplicity of olefinic groups therein such as, for example, butadiene, isoprene, isobutylene, 1,3-pentadiene; 1,4-pentadiene; 1,3-hexadiene; 1,4-hexadiene; 2,4-hexadiene, 1,3 cyclohexadiene, norboradiene, divinyl benzene, and the like as well as substituents thereon which are inert with respect to the subject reaction such as $C_1$–$C_3$ alkyl, aryl, alkaryl, halo, carbonyl and the like radicals.

The particular monomeric amino compound and the particular olefinic compound or groups of said compounds to be used will depend on the resultant product desired. It is preferred to utilize one amino compound with one olefinic compound to form a more well defined resultant polymeric product.

The above described monomeric olefin and amine are contacted with carbon monoxide, preferably in gaseous form, and with water. It has been unexpectedly found that water can be used in the subject process alone or in combination with minor amounts of hydrogen gas. Water, used alone, is preferred as it enhances the formation of the desired product. Further, the use of water has certain secondary benefits. It avoids the safety and other detrimental factors normally associated with hydrogen, and permits the process to be simplified. It is also realized that the other reactants and the liquid media used need not be in a dry state.

The equivalent ratio of olefin to amine contained in the reaction zone should be from about 1 to 10 with from 1 to 3 being preferred. It is sometimes suitable to have the olefinic compound present in large excess and act as liquid media or at least a part of the liquid media in which the process is carried out.

The reaction is performed under liquid phase conditions. Any suitable organic liquid can be employed which is inert to the reaction conditions, the reactants, the catalyst and the products. Examples of suitable solvents that can be used in accordance with this invention include hydrocarbons such as the aromatics, aliphatics or alicyclic hydrocarbons, ethers, esters, etc.

Examples of suitable hydrocarbons that can be employed as the solvent include aromatic hydrocarbons such as benzene, toluene, xylene, ethyl benzene, tetralin, etc; aliphatic hydrocarbons such as butane, pentane, isopentane, hexane, isohexane, heptane, octane, isooctane, naphtha, gasoline, kerosene, mineral oil, etc; elicyclic hydrocarbons, such as cyclopentane, cyclohexane, methylcyclopentane, decalin, indane, etc.

Ethers can also be employed as the reaction solvent, such as diisopropyl ether, di-n-butyl ether, ethylene glycol diisobutyl ether, methyl o-tolyl ether, ethylene glycol dibutyl ether, diisoamyl ether, methyl p-tolyl ether methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol diethyl ether, ethylene glycol diphenyl ether, triethylene glycol diethyl ether, diethylene glycol di-n-hexyl ether, tetraethylene glycol dimethyl ether, tetraethylene glycol dibutyl ether, etc. Various esters can also be employed as the solvent, such as ethyl formate, methyl acetate, ethyl acetate n-propyl formate, isopropyl acetate, ethyl propionate, n-propyl acetate, sec-butyl acetate, isobutyl acetate, ethyl-n-butylate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-butyl oxalate, n-butyl benzoate, diisoamyl phthalate, dimethyl phthalate, diethyl phthalate, benzyl benzoate, n-butyl phthalate, etc. A preferred class of ester solvents includes the lactones, e.g., butyrlactone valerolactone and their derivatives having lower ($C_1$–$C_5$) alkyl substituents.

Alcohols can also be employed as a reaction solvent. Preferably, the alcohol is a $C_1$–$C_8$ alcohol and can be a primary alcohol such as methanol, ethanol, n-propanol and the like; a secondary alcohol such as isopropanol, 1-methyl pentanol and the like; and tertiary alcohols, such as t-butyl and t-amyl alcohols.

Tertiary amines can also be employed as the reaction solvent, the nitrogen atom, by definition, being substituted with three hydrocarbyl groups which are inert with respect to the reaction, such as, for example, alkyl, aryl, alkaryl, aralkyl groups and the like. Examples of suitable tertiary amines include triethylamine, tripropylamine, triisobutylamine, trihexylamine, triheptylamine, triamylamine, dibenzyl ethylamine, dibutyl ethylamine, dimethyl pentylamine, diphenyl ethylamine, diphenyl methylamine, dimethyl aniline, pyridine, dimethyl pyridine, methoxy pyridine, methyl pyrrolidine, ethyl pyrrolidine and the like. The preferred solvents are the tertiary amines and, especially, pyridine, substituted pyrrolidine and its derivatives.

In the case where ammonia is the nitrogen containing compound as reactant, ammonia can also be used as the liquid solvent. The excess of that required to form the desired product is inert to the catalyst and does not exhibit detrimental effects. Ammonia should not be used as the solvent when other nitrogen containing reactants are used.

The particular solvent to be used will depend on its ability to remain in the liquid state at both ambient and at reaction conditions to facilitate the mixing of the components, its solvating ability with respect to at least some of the reactants, and its ease of handling, as can be readily determined by the artisan.

The reaction is performed under relatively mild conditions including temperatures from about 50° to about 250° C.; preferably from about 100° to about 200° C., and at pressures of from about 30 to about 300 atmospheres and, preferably, from about 30 to 100 atmospheres. The pressure can be maintained by the pressure of the carbon monoxide and, when used, hydrogen supplied to the reaction zone. If desired, a suitable inert gas, such as nitrogen, can also be charged to the reaction zone to supplement the partial pressure of the reaction gases.

The ratio of the reactants can be widely varied. The mole ratio of carbon monoxide to the hydrogen source should be at least 3:1. Higher ratios, such as 5:1 or above, are preferred. The carbon monoxide can be used in excess to form sufficient pressure required in the reaction zone, as described above. The mole ratio of hydrogen source (water alone or in combination with hydrogen) to amine moiety contained in the monomeric amine containing compound can be varied from about 1:10 to 10:1 with from about 1:3 to 3:1 being preferred. The particular ratio of olefin to amine should be at least 1:1 with the particular ratio depending on the reactivity of the monomeric reactants with respect to each other. Varying the ratio of olefin to amine will enable one to control the degree of N-functionalization in the polymer and also the amino/amido distribution. The exact distribution can be determined by routine experimentation with any particular set of reactants as conventionally done by those skilled in the art.

The catalyst required to aid in the formation of the desired polymeric polyamine/amide comprises rhodium compounds selected from elemental rhodium, rhodium salts, rhodium oxides, rhodium carbonyls, rhodium ligands as described herein below. The preferred catalysts are formed from rhodium compounds in which the rhodium is the plus one valence state. The exact chemical and physical composition of the entity which acts as the catalyst for the subject reaction is not known with certainty because of the possible restructuring and/or interaction of the rhodium compound used and the reactants contained in the reaction zone. Whether the rhodium compounds described herein directly act as the catalyst or as the precursor for the catalyst entity which causes the presently desired aminomethylation is immaterial. The subject rhodium compounds will be referred herein as the "catalyst" as they have unexpectedly been found to aid directly and/or indirectly in the formation of desired alkylated polyamines by the present one-step process and to give the desired product in high yields.

The rhodium compounds which are useful in the subject invention must have some degree of solubility in the liquid media in which the subject aminomethylation is to take place. The choice of liquid media and/or catalyst to be used in a particular reaction so that the catalyst has some degree of solubility can be readily determined by those skilled in the art using conventional methods.

The catalyst found useful in the subject process can be a rhodium salt of an inorganic acid such as, for example rhodium chloride, rhodium nitrate, rhodium sulfate, rhodium perchlorate and the like or of an organic acid such as rhodium acetate and the like. The rhodium salts are well known commercial products formed conventionally by the reaction of rhodium oxide with an acid. The salt can be used in its anhydrous state or as a hydrated salt. The hydrated salts are preferred.

The catalyst of the subject process can be a rhodium ligand. The ligand can be formed in coordination with rhodium in any one of its valence states; that is of zero or plus 1, 2 or 3. The ligand moiety is formed from chemical moieties which contain unshared electrons such as atoms selected from nitrogen, oxygen, phosphorous or sulfur or which contains unsaturation. The ligand can be in the form of a carbonyl; an olefin such as ethylene, butene and the like; diolefines such as norbornodiene, cyclooctadiene-1,5 and the like; aliphatic aromatic, aryl aliphatic phosphites, such as triethyl phosphite, tributyl phosphite, trimethyl phosphite, triphenyl phosphite, dimethylphenyl phosphite, tritolyl phosphite, tribenzyl phosphite, ditolyl phenyl phosphite, and the like; aliphatic and cyclic ethers such as dimethyl and diethyl oxide, dioxane, dialkyl ether glycols, acetyl acetone and the like; primary, secondary, and tertiary amines which contain alkyl, aryl, alkaryl, aralkyl cycloalkyl groups or mixtures thereof such as trimethyl amine, diethyl amine, toluidine and the like; heterocyclic bases such as pyridine, bypyridine and the like; ammonia; sulfides such as dialkyl, diaryl, alicyclic heterocyclic sulfides and the like; and mixtures of said ligand components with rhodium. When the ligand is formed from uncharged ligand components with charged rhodium, the compound is formed into a stable neutral state with an anion such as a chloride perchlorate, nitrate, hexaflourophosphate and the like.

The catalyst materials which are useful in the subject process can be generically described by the formula:

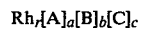

Rh$_r$[A]$_a$[B]$_b$[C]$_c$ wherein A represents an anion of an inorganic salt such as nitro, sulfo, halo, especially chloro, and the like; B represents a chemical moiety containing an entity having at least one pair of unshared electrons such as carbonyl, olefin, phosphite, ethers, amines, sulfides and mixtures thereof; C represents an anion capable of forming a neutral compound, such as chloride, hexaflourophosphite or the like; a, b and c each represent whole integers including O and r is an integer of one or greater.

The ligand may be added directly to the reaction medium and/or introduced into the medium as a complex of the ligand precursor with the rhodium salt, chelate, hydride or carbonyl. For example, the appropriate precursor of the desired ligand can be introduced into the reaction zone with a rhodium precursor such as, for example rhodium oxide, a rhodium carbonyl as dirhodium dichloro tetracarbonyl, and the like.

The rhobium compound useful in the present invention can be metallic rhodium. The metallic rhodium can be in any form such as a powder ribbon, or coated on an inert support. The inert support can be any conventional catalytic support as are well known such as formed from alumina, carbon, or a metal oxide, as, for example, an alkali or alkaline earth metal oxide and the like. The coating of metallic rhodium can be done by vapor disposition or other conventional methods and should be present in from about 2 to 8 percent by weight of the inert support. Metallic rhodium has, per se, substantially no degree of solubility in the liquid media contemplated for use but, it is believed that metallic rhodium reacts with some of the components in the reaction zone to form a soluble product which actually causes the desired aminomethylation to proceed. The metallic rhodium is, most probably, a precursor for the actual catalytic entity of the subject process.

The catalyst has been found to be effective to cause the formation of the desired polymeric polyamines as described above when used in a molar ratio of rhodium atom to olefin bond of from about $1 \times 10^{-4}$ to $10^{-5}$ and preferably from about $1 \times 10^{-4}$ to $1 \times 10^{-3}$. The most preferred range from both effectiveness and economy is from $5 \times 10^{-4}$ to $1 \times 10^{-3}$. Although greater amounts of catalyst can be used, such has not been found required.

The rhodium catalysts found useful in the subject invention may be used in combination with other metal complexes which are known to cause aminomethylation as for example iron or cobalt carbonyl complexes and the like, although poorer results are normally obtained. It is, therefore, preferred that the rhodium catalyst is the sole or major catalyst used in the subject reaction.

The preferred rhodium catalysts are those which have rhodium in its plus 1 valence state and has been complexed with a carbonyl or diolefin or both.

The process is carried out by contacting the above described reactants and the catalyst in a vessel which is preferably adapted for gas injection, agitation and heating. The liquid media is first introduced followed by the monomeric olefinic containing compound, the monomeric amine containing compound and the rhodium catalyst. Water is added along with the other components. The reaction is carried out under elevated temperature and pressure. The vessel is closed and charged to a specific pressure with carbon monoxide alone or aided by the addition of an inert gas. The reactor and its contents are maintained at the desired elevated temperature for a sufficient period to cause the formation of polymeric polyamine/amide which is normally accomplished in a period of time from about 15 minutes to about 10 hours with from about 30 minutes to 5 hours being sufficient and preferred in most instances. The vessel is then cooled and, where appropriate, degassed and the polymeric product is recovered by standard technique, such as by precipitation in a non-solvent, extraction and drying under vacuum. The amino nitrogen contained in the resultant polymer can be determined by standard analytical techniques.

The following examples are for illustrative purposes only and are not meant to be a limitation on the subject invention except as indicated in the appended claims. All parts and percentages are by weight unless otherwise indicated.

EXAMPLE I

A 150 ml stainless steel reaction vessel was charged with 4 gm of piperazine, 0.8 ml of water, 10 ml of N-methyl piperidine, 5 ml of 1,5-hexadiene and 120 mg of commercially obtained tris (dimethylphenylphosphine) norbornadiene rhodium (I) hexafluorophosphate

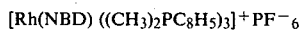

[Rh(NBD) ((CH$_3$)$_2$PC$_8$H$_5$)$_3$]$^+$PF$^-_6$

The reaction vessel was sealed and pressurized to 1000 psig with carbon monoxide at 25° C. The sealed vessel was placed in an oil shaker bath for 8 hours at 140° C. About 3.5 gm of a reddish-brown solid was obtained. The solid was dissolved in tetrahydrofuran and precipitated in water. The solid was analyzed by H-NMR to contain tertiary amino groups therein. The solid was soluble in aqueous HCl (pH of 1.5) which indicates amine structure.

EXAMPLE II

A 150 ml stainless steel reaction vessel was charged with 20 ml of N-methyl pyrrolidine, 1.8 ml of diionized water, 3.3 ml of ethylene diamine, 4 mg hydroquinone and 1,2-bis(diphenylphosphino)ethane norbornadiene rhodium hexafluorophosphate. The reaction vessel was then charged with 3 ml of 1,3-butadiene and pressurized to 1000 psi with carbon monoxide at −40° C. The reactor was then placed in an oil shaker bath and maintained at 140° C. for 10 hours. The reactor was cooled and a reddish-brown tacky solid product was obtained. The product was taken up in diethyl ether and precipitated in water. The product was found to be soluble in various organic solvents as well as aqueous HCl (pH 1.5).

EXAMPLE III

The procedures of Example I and of Example II are repeated except that each of the catalysts is substituted with $Rh_6(CO)_{16}$; $Rh\ Cl_3(C_5H_5N)_3$; $Rh(CO)_2(C_5H_7O_2)$; and $[Rh\ Cl_3(C_7H_8)]_2$. In each case a solid product is obtained which is similar to that formed in Example I and II respectively.

EXAMPLE IV

The procedure of Example I is repeated except that an equivalent amount of t-butanol is substituted for N-methyl piperizine. A product similar to that described in Example I is obtained.

While the invention has been described in connection with certain preferred embodiments, it is not intended to limit the invention to the particular forms set forth, but, on the contrary, it is intended to cover such alternatives, modifications and equivalents as defined by the appended claims.

What is claimed:

1. A process for forming polymeric polyamine/amide wherein said amino/amido nitrogens are positioned in the polymer backbone comprising contacting, in a reaction zone containing an inert solvent, and, as reactants, a hydrocarbon compound containing at least two olefinic groups therein, water, carbon monoxide and a nitrogen containing compound having at least 2 labile hydrogens, at a temperature of from about 50° to 250° C. and at a pressure of from about 30 to about 300 atmospheres in the presence of a catalyst consisting essentially of a rhodium atom containing compound selected from metallic rhodium, rhodium salts, rhodium carbonyls, rhodium oxides or ligands thereof.

2. The process of claim 1 wherein the rhodium compound contains a ligand moiety possessing olefinic unsaturation or at least one atom selected from oxygen, sulfur, phosphorus or nitrogen.

3. The process of claim 1 wherein the catalyst is a rhodium atom containing compound having the general formula:

$$Rh_r[A]_a[B]_b[C]_c$$

wherein A represents halo, nitro or sulfo; B represents a chemical moiety containing at least one pair of unshared electrons selected from carbonyls, olefins, phosphites, ethers, amines, sulfides or mixtures thereof; and C is a neutral compound forming anion, r is a whole integer of one or greater and a, b and c are each whole integers including zero.

4. The process of claim 3 wherein the nitrogen containing compound has two amino groups which are selected from primary or secondary amino groups.

5. The process of claim 3 wherein the amino compound is ammonia.

6. The process of claim 4 wherein the olefin bond containing compound is a $C_4$ to $C_{20}$ compound having two olefinic groups therein.

7. The process of claim 4 wherein the molar ratio of carbon monoxide to water plus hydrogen is at least about 3:1; of water plus hydrogen to amino group is 1:10 to 10:1; and of olefinic group to amine group is at least about 1:1.

8. The process of claim 7 wherein the catalyst is present in an amount such that the molar ratio of rhodium atom to olefin bond is from about $1 \times 10^{-4}$ to $2.5 \times 10^{-3}$.

* * * * *